H. L. MERRICK.
AUTOMATIC WEIGHER.
APPLICATION FILED NOV. 23, 1907.
1,018,068.
Patented Feb. 20, 1912.
3 SHEETS—SHEET 1.
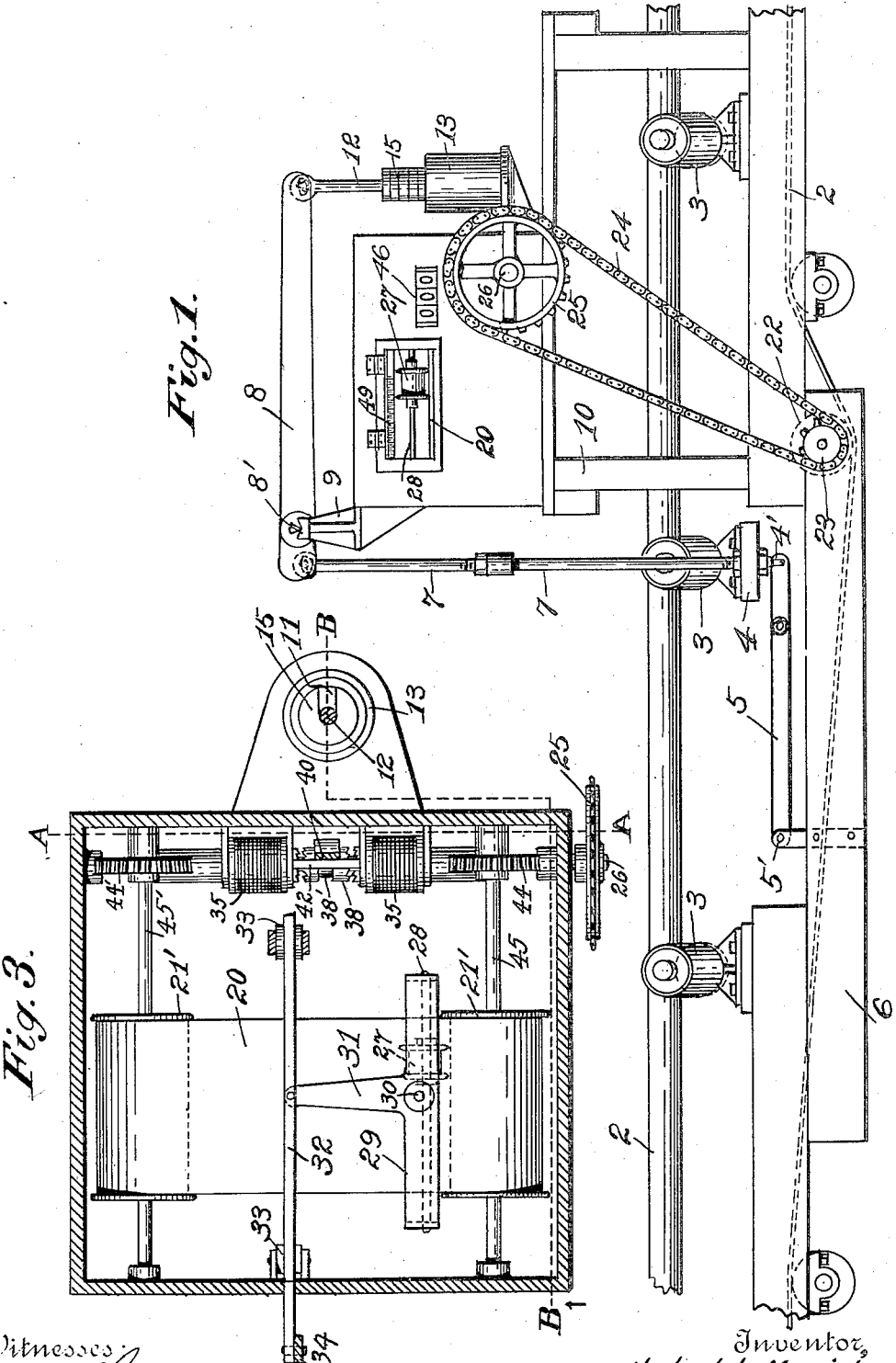
Witnesses:
William E. Crowley
David Held
Inventor,
Herbert L. Merrick,
By his Attorney,
Pierson L. Wells

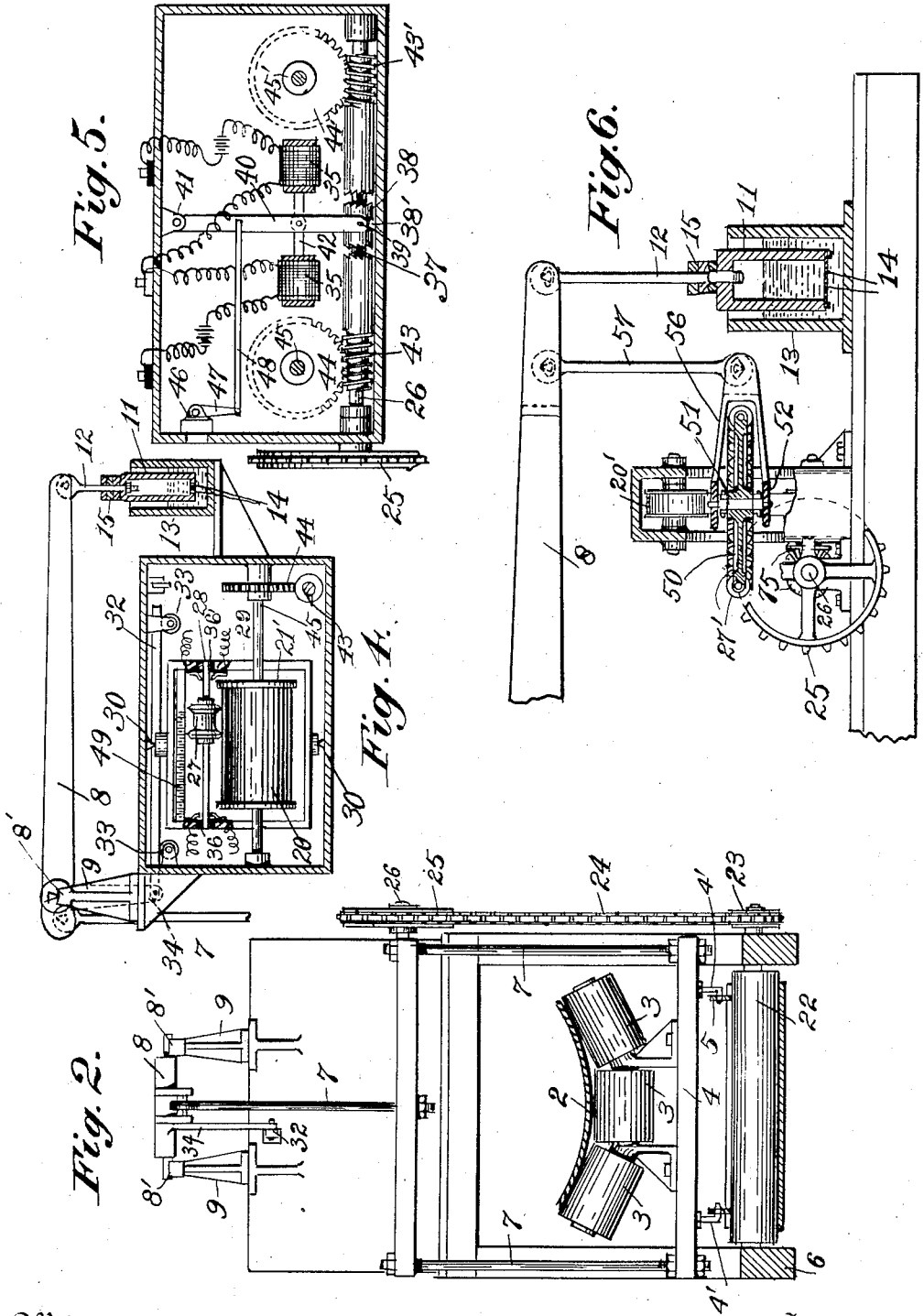

H. L. MERRICK.
AUTOMATIC WEIGHER.
APPLICATION FILED NOV. 23, 1907.
1,018,068.
Patented Feb. 20, 1912.
3 SHEETS—SHEET 3.
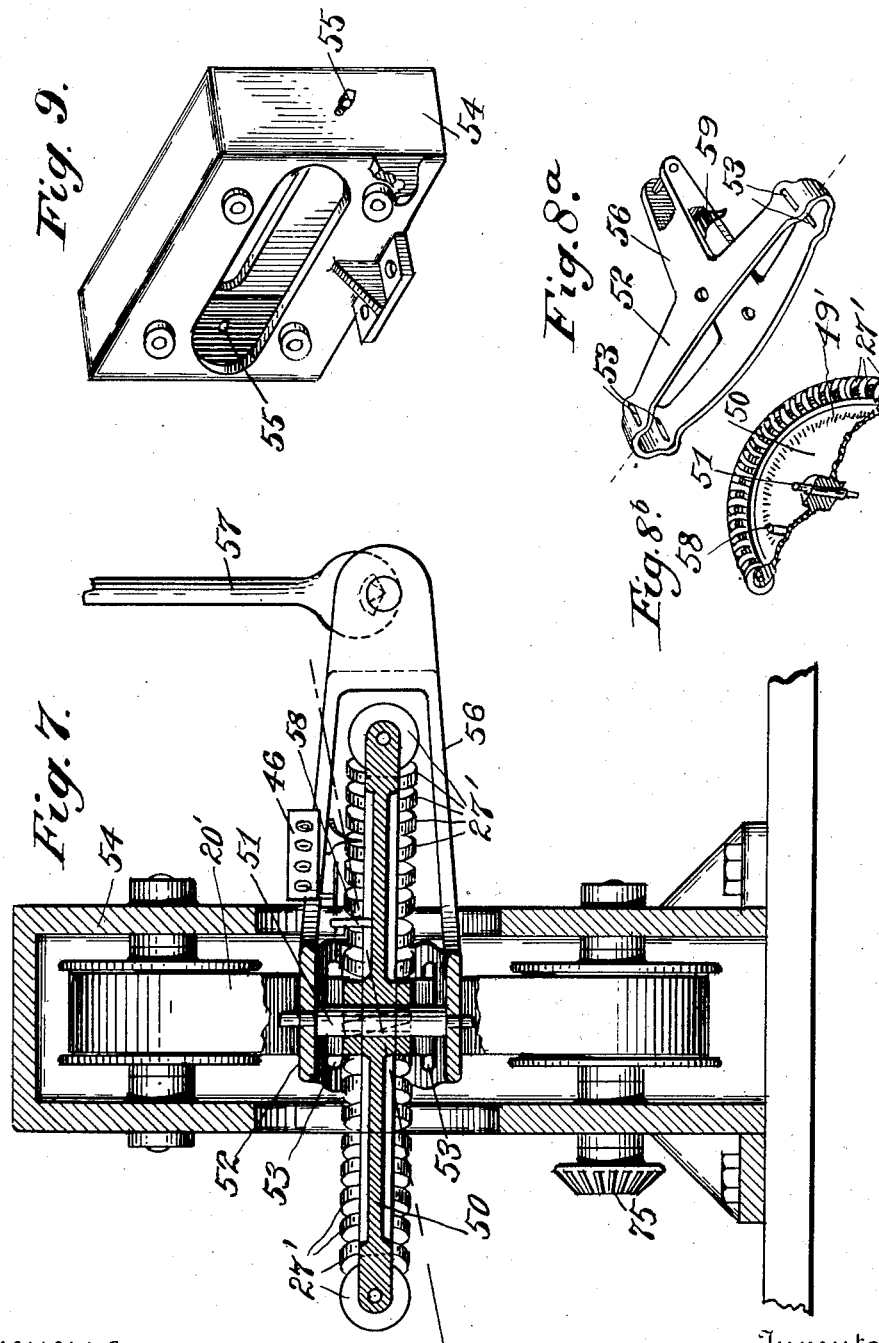

UNITED STATES PATENT OFFICE.

HERBERT L. MERRICK, OF PASSAIC, NEW JERSEY.

AUTOMATIC WEIGHER.

1,018,068.   Specification of Letters Patent.   Patented Feb. 20, 1912.

Application filed November 23, 1907. Serial No. 403,437.

*To all whom it may concern:*

Be it known that I, HERBERT L. MERRICK, of Passaic, New Jersey, have invented a certain new and useful Improvement in Automatic Weighers, of which the following is a specification.

The present invention embraces an apparatus for automatically weighing material by an operation which progresses in a continuous manner with the progress of the material toward and past the weighing point through means of a mechanical method of conveyance, and in registering the weight so passing said point without interfering with the continuity of the transferring, weighing or registering actions.

The present invention is applicable generally to the weighing of material, irrespective of the means by which it is brought to the weighing point, whether by belt conveyers, bucket conveyers, etc., but it is herein illustrated as applied to the weighing of the load transported by a conveying belt.

In general, the present weigher comprises a traveling surface such as that of a belt whose movement is a function of the movement of the conveying belt and a planimeter or integrating wheel in frictional engagement with such auxiliary belt. The zero or no load position of said wheel is that in which the wheel merely rotates on its axis, that is to say in which its plane of rotation is in parallelism with the line of travel of the belt while scale mechanism is operative to cause an angular relation between the two which changes with the fluctuations in the load passing the weighing point. The lateral or axial thrust thus created is expended in moving the wheel transversely across the auxiliary belt at a variable rate with a variable loading of the belt. The time consumed in crossing the belt is thus a function of the conveying belt travel and the transmitted load and to indicate the integrated quantity, to wit, the load, the wheel may be caused to move back and forth across the belt and the number of excursions counted. On the other hand the transverse or lateral motion of the integrating wheel may be rendered unidirectional by mounting a plurality or series of the same on a carrier which is actuated by the lateral or axial thrust aforesaid. The number of complete movements of the carrier may be registered with a like result to the registration of the separate traverses of the individual wheel.

In the drawings accompanying the present specification, Figure 1 is a side elevation of a portion of a conveying belt with which is combined a weigher embodying the features of the present invention. Fig. 2 is partly an end elevation, partly a cross section. Fig. 3 is a plan view with top of casing cut away. Fig. 4 is a sectional elevation on line B—B in Fig. 3 looking in the direction of the arrow, this figure and the remaining figures being upon a somewhat enlarged scale. Fig. 5 is a sectional elevation on line A—A, Fig. 3, looking from the right. Fig. 6 is a side elevation of a portion of a weighing beam and that form of integrating device in which a plurality of integrating wheels are mounted on a carrier, certain parts being broken away and certain other parts being in section. Fig. 7 shows the assembled carrier and integrating wheels, and certain associated parts, also indicating in a general way the change in relationship caused by fluctuations of the weighing beam. Fig. 8$^a$ is a perspective view of the pivotally mounted supporting frame. Fig. 8$^b$ is a perspective sectional view of carrier and integrating wheels. Fig. 9 is a similar view of the housing for said frame.

Similar characters of reference designate corresponding parts in all figures.

A conveying belt 2 is indicated whose upper or carrying stretch is supported on trough-forming rolls 3 in a well known manner. At a convenient point past which the belt travels (herein designated the weighing point) the load on the belt is caused to influence a steelyard, weighing beam or weighing scale, designated herein, in a general way, by the term scale mechanism. Any suitable and appropriate construction for this purpose may be adopted. For instance 4 designates a platform carrying a set of trough-forming belt-supporting rolls 3 and joined by connecting rods 4' with a guiding frame 5 fulcrumed by a rod 5' to the frame work 6 of the apparatus. Platform 4 is hung by side links 7 from one end of a steelyard or beam 8. Points of suspension may of course be knife edges when desired while the beam is fulcrumed intermediate its ends by a similar device, see 8' to standards 9 erected upon a supplemental frame work 10.

In order to offset the weight of the load on the conveyer some suitable form of resistance is connected to steelyard 8. The one illustrated comprises a compensating variable resistance embodying a combined mercury float and dash pot consisting of a hollow cylinder 11 suspended by a link 12 from the end of beam 8 and dipping into a mass of mercury in an open vessel 13 on frame 10. This float so acts as to permit a constantly increasing movement of the beam from its normal or no load position for constantly increasing loads on the suspended portion of the conveyer. To prevent too rapid vibration of the beam, the bottom of float 11 is closed and small openings 14 throttle the passage of mercury and air, tending only to retard the action without affecting the accurate movement of the float. Adjustable weights 15 balance the static load so that the system assumes its normal or zero position when there is no load passing the weighing point.

In the weigher illustrated in Figs. 1 to 5, inclusive, a traveling surface moving in synchronism with the conveying belt is formed by the face of an endless belt 20 running over rolls 21', 21' and driven from the conveying belt, the lower stretch of the belt driving a roll 22, rigid with which is a sprocket wheel 23 over which runs a driving chain 24 embracing a sprocket wheel 25 affixed to a shaft 26 mounted in bearings supported by the weigher casing.

The integrating wheel may comprise a plurality of disks or a single disk. The present wheel 27 has a plurality of disks and they bear against the surface of belt 20. Wheel 27 is so mounted that while in its zero or no load position its plane of rotation is practically coincident with the line of travel of belt 20, yet for a loaded condition of the conveying belt its plane of rotation is caused to assume an angle to such line of direction in such a manner that as the load increases such angle likewise increases and vice versa. That is to say, as here embodied, shaft 28 of wheel 27 is disposed in a frame 29 which incloses belt 20, above, below and at the sides. This frame is pivoted to turn about an axis perpendicular to the surface of belt 20 defined by pivot pins 30 and is provided with a laterally extending arm 31 with which a slide bar 32 engages. This slide bar, preferably, moves on antifriction rollers 33 and is pivoted to the end of arm 34 extending from beam 8.

If wheel 27 were prevented from moving axially a relative slipping of the belt and wheel would ensue tending to wear the wheel out of round and hence interfere with the accurate operation of the device. I therefore construct the wheel for axial movement under the action of the lateral or axial force component of the frictional effort (constant for a constant load and variable for a variable load) obviating thus the relative slipping of the engaging parts and in order to render the operation continuous, provide means for so automatically altering the relation of the coöperative parts that the wheel having reached a point adjacent to one edge of the belt is caused to travel toward the opposite edge and so on alternately. That is to say, in the present embodiment, wheel 27 is rotatably and slidably mounted on the fixed shaft 28 and is caused at each extremity of its axial movement to control the operation of an extraneous force or motor which in turn causes a reversal of movement of belt 20. Preferably, in order to throw as little work upon wheel 27 as possible during these reversing operations (a minimum of retardant force minimizing the error of the weighing indication) I may, as shown, use an electrically operated motor element in the nature of a solenoid 35, one for effecting the reverse when wheel 27 has reached the reversing point adjacent to one edge of the belt and the other for a similar purpose at the opposite edge. Switches 36, and 36' adjacent to the ends of shaft 28 are each adapted to have its electric continuity completed when wheel 27 comes in contact with it. One finger of each switch may be grounded to the weigher casing and, similarly, as to one end of the wire of each solenoid, while the remaining ends of the solenoid wires are connected to the corresponding insulated switch fingers.

Slidably mounted on a feather or key 37 of shaft 26 is a clutch member 38 into a circumferential groove 38' of which extends one or more pins 39 which project from the free end of a lever 40 pivoted at 41 to the weigher casing and to which lever is also connected the core 42 of solenoids 35, 35. According as clutch member 38 is moved to its right or its left hand position in Fig. 5 (through the action of the corresponding solenoid) either one or the other of a pair of right and left hand worms 43, 43' is rigidly connected to shaft 26 and belt 20 driven in one direction or the other through worm wheels 44, 44' affixed to respective shafts 45, 45' of the belt supporting rolls 21, 21'.

If the apparatus is appropriately adjusted and calibrated, it is plain that the number of reversals of belt 20 occurring within a given time may serve to indicate the total weight carried past the weighing point within that time. These reversals, and hence the weight conveyed may be indicated by an instrument in the nature of a counter 46 whose actuating arm 47 is connected by a link 48 with lever 40. If it is desired, moreover, that the weight conveyed between the times of two consecutive reversals should be ascertainable, a properly graduated scale 49 may be secured to frame 29 in such a position, that, in conjunction with wheel 27, the weight may be read off.

Instead of a construction involving successive reversals in direction of motion with necessary provision of reversing mechanism representing increased cost and added mechanical complexity, I may mount a plurality or series of integrating wheels on a carrier in such a relation that in the zero, or non-integrating (no load) position, the integrating wheel in contact with the friction belt merely rotates on its axis and there is no force component normal to the plane of rotation of the wheel. When, however, an angular relation is brought about under the influence of the loaded weighing beam, a force component is established which tends to turn the carrier. As here constructed, the carrier, see Figs. 6 to 9 inclusive, is a rotary disk 50 whose shaft 51 is mounted in a frame 52 which diametrically encircles the disk and is slotted at 53 for the passage of two parallel stretches of endless belt 20' which may be driven by means similar to that already described with reference to belt 20 through interposed bevel gears 75. Frame 52 is pivotally mounted in a housing 54, see pivot pins 55, to turn about an axis which intersects, at least approximately, the axis of rotation of the disk and is perpendicular thereto. An arm-like extension 56 of frame 52 is hung from a weighing beam 8 (the construction of which as well as its associated parts may be as already described) by a suspension link 57. The construction is thus such that frame 52 may swing in a plane parallel to the surface planes of the aforesaid parallel stretches of belt 20'. Around the periphery of disk 50 is disposed a series of rolls 27', all independently rotatable about an axis extending circumferentially of the disk and the plane of which is perpendicular to the rotative axis of the disk. Each of the rolls 27' constitutes an integrating wheel, the particular roll in contact with the moving belt 20' merely rotating about its axis in the no load position of the apparatus without any tendency existing to rotate disk 50. When, however, through the movement of the weighing beam, the angular relation is changed, the force component perpendicular to the plane of rotation of each integrating wheel 27' and tangential to disk 50 produces an angular motion of the latter and a bodily motion of the wheel across the surface of the belt, the following wheels succesively coming into action in orderly procession. The rotation of disk 50 is thus continuous as long as a load is being transported by the conveyer, the parts being so related that there is always at least one wheel 27' in action. I prefer to have the wheels at diametrically opposite sides of the disk contact with the two parallel oppositely moving stretches of belt 20' in order to decrease side thrust and accentuate the tendency to rotate the disk uniformly and to minimize the tendency of the frictional resistance to rotation of the disk to cause slipping; belt 20' is therefore caused to press against the wheels at opposite sides of the disk with the desired and appropriate pressure. Each integrating wheel 27' is also preferably somewhat tapering toward each end so that the outline of all the wheels coincide with the circumscribing circumference of the assembled disk and wheels in plan view. Rotations of disk 50 may be registered and the weight indicated as before by a counter 46 actuated by a pin 58 on the disk, while a graduated scale 49' and pointer 59 serve a like purpose to the scale, etc., already mentioned.

Obviously anti-friction bearings may be used wherever they are found practicable and it is desirable to decrease the frictional resistance with consequent increase of sensitiveness.

From the foregoing description, it is clear that the registration is intermittent in action thus creating no constant retardant action which would tend to impair the freedom of movement of the integrating wheel (and hence accuracy of the registration) as would be the case if the device were in constant connection with the wheel. It is also to be noted that in both modifications the operation of the apparatus opposes no sensible retardant force to the movement of the beam and hence the sentitiveness of its action in responding to fluctuations of load is not interfered with.

The integrating wheel is free to move both rotarily and axially and the movement of the beam accomplishes merely the turning of the wheel about its point of contact with the moving surface.

Having described my invention, I claim:—

1. In an automatic weigher, the combination of a supporting framework, supporting rolls mounted thereon, scale mechanism, a supporting roll interposed between the supporting rolls on the framework and constituting a part of said scale mechanism, a conveying belt, an integrating wheel, a traveling element constituting a surface by which said wheel is frictionally actuated, mechanism for moving said element in synchronism with the conveying belt, and means interposed between said scale mechanism and said integrating wheel whereby the angle between the line of movement of said traveling element and the plane of rotation of said wheel varies with variations in the belt loading.

2. In an automatic weigher, the combination of a supporting framework, supporting rolls mounted thereon, scale mechanism, a supporting roll interposed between the supporting rolls on the framework and constituting a part of said scale mechanism, an endless load conveyer carried by said supporting rolls, an axially and rotatably movable integrating wheel, a traveling element constituting a surface by which said wheel is frictionally actuated with its plane of rotation parallel to the line of travel of said element in the zero or no load position, mechanism for moving said element in synchronism with the rate at which the load is transferred by said load conveyer, means interposed between said scale mechanism and said integrating wheel whereby the angle between the line of movement of said traveling element and the plane of rotation of said wheel varies with variations in the load, and means for indicating the extent of axial movement of said wheel.

3. In an automatic weigher, the combination of a supporting framework, scale mechanism, a supporting roll interposed between the supporting rolls on the framework and constituting a part of said scale mechanism, an endless load conveyer carried by said supporting rolls, a rotary carrier, a series of integrating wheels mounted on the periphery of said carrier on axes extending circumferentially of the carrier, a traveling belt having two substantially parallel stretches with the surfaces of which the integrating wheels at opposite sides of the carrier frictionally engage with the plane of rotation of the carrier normal to the line of travel of said traveling belt in the zero or no load position, mechanism for moving said traveling belt in synchronism with the rate at which the load is transferred by said load conveyer, means interposed between said scale mechanism and said carrier for shifting the carrier out of said zero position, and means for indicating the extent of rotation of the carrier.

4. In an automatic weigher, the combination with a supporting framework, supporting rolls mounted thereon, an endless load conveyer carried by said supporting rolls and an integrating wheel, of means for varying the angular velocity of said integrating wheel with variations in the weight of the load passing the weighing point, said means comprising scale mechanism, a supporting roll interposed between said supporting rolls on the framework and constituting a part of said scale mechanism, a connection between said scale mechanism and said integrating wheel and a traveling element constituting a surface by which said integrating wheel is frictionally actuated and means for moving said traveling element in synchronism with the moving load.

In testimony whereof I have signed my name to the specification in the presence of two subscribing witnesses.

HERBERT L. MERRICK.

Witnesses:
PIERSON L. WELLS,
HENRY LEVIS.